United States Patent
Lekutai

(10) Patent No.: US 11,558,106 B2
(45) Date of Patent: Jan. 17, 2023

(54) SIGNAL INTERFERENCE MITIGATION FOR UAVS

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 48 days.

(21) Appl. No.: 16/938,836

(22) Filed: Jul. 24, 2020

(65) Prior Publication Data

US 2022/0029695 A1 Jan. 27, 2022

(51) Int. Cl.
*H04B 7/185* (2006.01)
*H04L 5/14* (2006.01)

(52) U.S. Cl.
CPC ........... *H04B 7/18504* (2013.01); *H04L 5/14* (2013.01)

(58) Field of Classification Search
CPC .............................. H04B 7/18504; H04L 5/14
See application file for complete search history.

(56) References Cited

U.S. PATENT DOCUMENTS

| | | | |
|---|---|---|---|
| 2016/0330771 A1* | 11/2016 | Tan | H04B 7/18506 |
| 2017/0272131 A1 | 9/2017 | Ananth et al. | |
| 2018/0013193 A1 | 1/2018 | Olsen et al. | |
| 2018/0375568 A1* | 12/2018 | De Rosa | H04W 72/082 |
| 2019/0012923 A1* | 1/2019 | Weisbrod | G01S 19/46 |
| 2019/0173201 A1* | 6/2019 | Chen | H01Q 25/005 |
| 2019/0212724 A1* | 7/2019 | Phuyal | H04B 7/18506 |
| 2019/0222256 A1* | 7/2019 | Nammi | H04B 1/7143 |
| 2019/0306675 A1 | 10/2019 | Xue et al. | |
| 2019/0363843 A1* | 11/2019 | Gordaychik | H04L 1/1854 |
| 2020/0007825 A1* | 1/2020 | Jeong | H02J 7/0042 |
| 2020/0037219 A1* | 1/2020 | Kumar | H04W 36/32 |
| 2020/0153598 A1* | 5/2020 | Weissman | H04L 5/0092 |
| 2020/0229015 A1* | 7/2020 | Wang | H04W 36/0085 |
| 2020/0252941 A1* | 8/2020 | Schmidt | H04W 36/16 |
| 2021/0185568 A1* | 6/2021 | Chang | H04W 74/006 |

\* cited by examiner

*Primary Examiner* — Jason E Mattis
*Assistant Examiner* — Bailor C Hsu
(74) *Attorney, Agent, or Firm* — Han Santos, PLLC

(57) ABSTRACT

A communication uplink between a UAV and a base station is established using frequency division duplex (FDD) communication and a communication downlink between the UAV and the base station using time division duplex (TDD) communication. A determination of whether the UAV is located above an antenna height threshold is then made. When the UAV is located above the antenna height threshold, the communication uplink is transitioned from using the FDD communication to using the TDD communication while the use of the TDD communication is continued for the communication downlink. When the UAV is located at or below the antenna height threshold, the use of the FDD communication is continued for the communication uplink and the TDD communication for the communication downlink.

20 Claims, 7 Drawing Sheets

SIGNAL INTERFERENCE MITIGATION FOR UAVS

BACKGROUND

Unmanned aerial vehicles (UAVs) are aircraft that are controlled from a ground-based control device rather than an onboard human pilot. UAVs are being used in an ever-increasing number of roles in both the civilian and military sectors. These roles may include law enforcement surveillance, journalism, cinematograph, scientific research and monitoring, search and rescue, cargo transport, package delivery, etc. UAVs are also popular toys for recreational users and hobbyists. While some UAVs can perform limited autonomous flight, UAVs generally rely on control commands provided by ground-based control devices to carry out flight maneuvers and travel. Accordingly, a UAV operator may use a wireless carrier network provided by a mobile network operator (MNO) to communicatively link a ground-based control device of the UAV operator with UAVs that are performing flight operations. For example, the wireless carrier network may be used to continuously transmit flight control commands and guidance data to a UAV, as well as receive UAV telemetry and UAV operation status information from the UAV.

However, the use of a wireless carrier network by UAVs may occasionally cause problems for other user devices of the wireless carrier network. Due to a decreased number of terrain obstacles and increased line-of-sight at higher altitudes, the number of base stations for which a UAV may potentially establish communication with and switch between can greatly increase with flight altitude. For example, while a UAV may only detect uplink signals from 2-5 base stations on the ground, the UAV can detect uplink signals from up to 10-16 base stations when the UAV is at normal flight altitude. When there are multiple UAVs in an area, the large distances that their downlink radio signals can travel, as well as their abilities to detect a great number of uplink radio signals from nearby base stations and their subsequent attempt to communicate with such base stations via downlink radio signals, can result in significant radio interference in the area. Such radio interference may not only affect the UAVs themselves but also cause interference to ground-based communication devices in the area, such as mobile phones and infotainment systems in cars.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
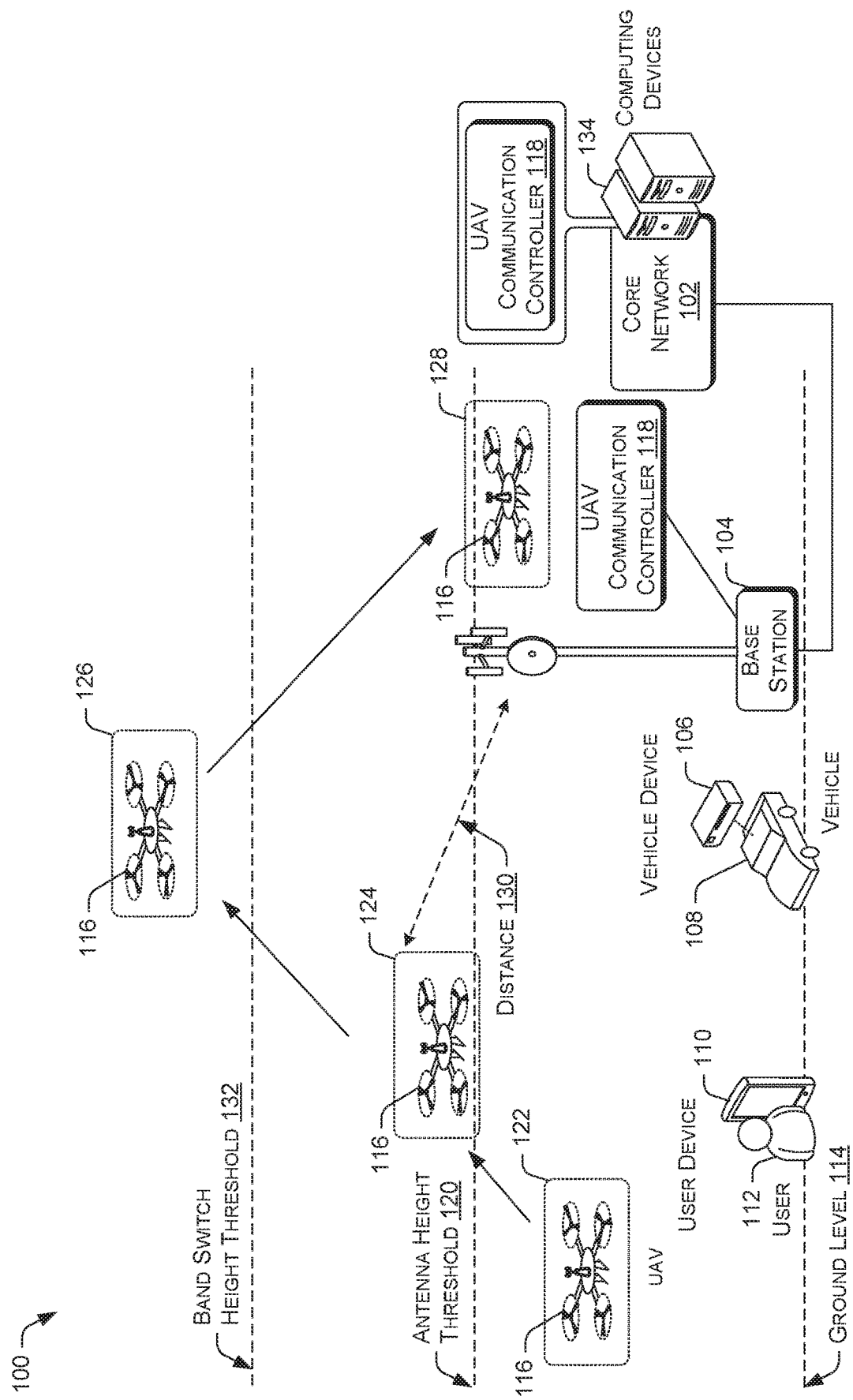
FIG. 1 illustrates an example architecture for mitigating radio signal interference caused by UAVs that use a wireless carrier network.

This disclosure is directed to the mitigation of radio interference to a wireless carrier network by the radio signals of unmanned aerial vehicles (UAVs). The mitigation may include switching a UAV from using frequency division duplex (FDD) communication for uplink communication with base stations to using time division duplex (TDD) communication when the UAV is located above a base station antenna height. Conversely, the UAV may switch from using TDD communication back to FDD communication when the UAV is located at or below the base station antenna height. These switches may be performed because radio interference from a UAV may increase dramatically when the UAV is above base station antenna height. For example, the base station antenna height may be around 100 feet above ground level. TDD uses a single radio channel for both uplink and downlink communication traffic, in which TDD communication may be configured by a mobile network operator (MNO) of the wireless carrier network to have a higher ratio of downlink traffic time slots to uplink traffic time slots. This use of a single radio channel and the relative reduction in uplink traffic in comparison to downlink traffic may reduce radio interface caused by UAVs when compared to using FDD communication. This is because FDD communication is configured to constantly use a set of one or more radio channels for uplink communication and another set of one or more radio channels for downlink communication. As a result, radio interference to FDD communication may cause significant impact to other communication devices in the vicinity that are using radio channels of the wireless career network. On the other hand, the impact of radio interference to TDD communication on other communication devices in the vicinity is limited by the reduced number of uplink traffic time slots.

In some embodiments, a communication uplink between a UAV and a base station may be established using FDD communication and a communication downlink between the UAV and the base station may be established using TDD communication. Subsequently, a determination may be made as to whether the UAV is located above an antenna height threshold. For example, the UAV may be changing altitude during flight. Thus, if the UAV is determined to be above the antenna height threshold, the UAV may be directed to use TDD communication for the communication uplink between the UAV and the base station while maintaining the use of TDD communication for the communication downlink between the UAV and the base station. Subsequently, if the UAV is determined to be at or below the antenna height threshold, the UAV may be directed to once again use FDD communication for the communication uplink between the UAV and the base station.

In other embodiments, the switching of the communication uplinks between FDD and TDD communication for UAVs may also be combined with communication band switching based on UAV altitude and speed to enhance UAV radio communication performance without causing radio interference to the wireless carrier network. For example, a UAV can communicate with a base station using three different licensed communication bands: (1) low-frequency communication band 600-800 MHz, (2) mid-frequency communication band 1900-3700 MHz, and (3) high-frequency communication band 24-39 GHz. These bands provide different signal performance based on the distance between the UAV to the base station and the height of the UAV. For example, the high-frequency communication band provides superior performance over other bands when the UAV is close to a base station or is at a higher altitude. Further techniques for enhancing the UAV radio communication performance may include implementing carrier aggregation by using one or more unlicensed communication bands in conjunction with any of the licensed communication bands. Example implementations are provided below with reference to the following FIGS. 1-7.

Example Environment Architecture

FIG. 1 illustrates an example architecture for mitigating radio signal interference caused by UAVs that use a wireless carrier network. The architecture 100 may include a wireless carrier network that is operated by a mobile network operator (MNO). The wireless carrier network may include a core network 102 and a radio access network. The radio access network may include multiple base stations, such as the base stations 104. Each of the base stations may provide a corresponding network cell that delivers telecommunication and data communication coverage. The core network 102 may use the network cells to provide wireless communication services to user devices. The core network 102 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 102 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 102.

Accordingly, the base stations are responsible for handling voice and data traffic between user devices and the core network 102. In some instances, the user devices may include mobile phones, tablet computers, embedded computer systems, or any other device that is capable of using the wireless communication services that are provided by the wireless carrier network. For example, the user devices may include a vehicle device 106 (e.g., an infotainment system) that is installed on a vehicle 108, and a user device 110 that is used by a user 112. The vehicle device 106 and user device 110, which are serviced by the base station 104, may generally operate at or near the ground level 114. In various embodiments, the base station 104 may support both 4G and 5G wireless communication.

In such embodiments, the base station 104 may be topped with one or more antennas that provide communication uplink and downlink with user devices. The height at which these one or more antennas are located on one or more base stations may be referred to as an antenna height threshold 120. In some instances, an antenna height threshold for a geographical area may be an average of the heights of antennas on the base stations in the geographical area, a height of a highest antenna in the geographical area, or a height of a lowest antenna in the geographical area. In one implementation, the antenna height threshold 120 may be at or near 100 feet above the ground level 114.

UAVs, such as a UAV 116, may operate at different altitudes that exceed the antenna height threshold 120 of the base station 104. The UAV 116 may use the communication uplink and downlink provided by the base station 104 to communicate with a UAV controller, such as a ground-based UAV control station. Communication uplink is used by the base station 104 to send data to the UAV 116, and communication downlink is used by the UAV 116 to send data back to the base station 104. For example, the UAV 116 may use the communication downlink provided by the base station 104 to send UAV identification, location data, vehicle status data, sensor data, and/or so forth to the UAV controller. In turn, the UAV controller may use the communication uplink provided by the base station 104 to send various control commands, e.g., flight control commands, sensor operation commands, etc. to the UAV 116. The UAV 116 may perform different roles in different implementations, such as law enforcement surveillance, journalism, cinematograph, scientific research and monitoring, utility and transportation structure monitoring, search and rescue, cargo transport, etc. In some instances, the UAVs are also operated by hobbyists and recreational users.

The base station 104 may include a UAV communication controller 118 that switches the uplink communication between the base station and the UAV 116 between FDD communication and TDD communication based on an altitude of the UAV 116 above ground level 114. The UAV 116 may be equipped with both FDD and TDD radio transceivers, and the base station 104 may include communication equipment that support both FDD and TDD communication. The base station 104 may initially established uplink communication with the UAV 116 via FDD communication. Subsequently, the UAV communication controller 118 may determine the altitude of the UAV 116 as the UAV 116 engages in flight operations. In some implementations, the UAV communication controller 118 may determine the altitude of the UAV 116 based on altitude information reported by the UAV 116. In other implementations, the UAV communication controller 118 may determine the altitude of the UAV 116 by using multiple base stations that are in communication range of the UAV 116 to perform a radio triangulation to obtain a geolocation and altitude of the UAV 116. Accordingly, the communication uplink between the base station 104 and the UAV 116 may be implemented via FDD communication when the UAV 116 is at a location 122 that is at or below the antenna height threshold 120. However, as the UAV 116 moves to locations 124 and 126 that are above the antenna height threshold 120, the UAV communication controller 118 may direct the base station 104 to use TDD communication for the communication uplink with the UAV 116. The TDD communication may have a pre-established ratio between downlink (DL) to uplink (UL) time slots (e.g., 4:1, 3:1, etc.). Subsequently, when the UAV 116 moves to a location 128 that is below the antenna height threshold 120, the UAV communication controller 118 may once again direct the base station 104 to use FDD communication for the communication uplink the UAV 116. On the other hand, the downlink communication between the UAV 116 and the base station 104 may remain TDD communication regardless of the height of the UAV 116 above the ground level 114. Such switching of the communication uplink for the UAV 116 between FDD communication and TDD communication may reduce radio interference to the vehicle device 106 and the user device 110.

In other embodiments, the switching of the communication uplink between FDD and TDD communication for the UAV 116 may be combined with communication band switching based on UAV altitude and speed. For example, the UAV 116 can communicate with a base station using three different licensed communication bands: (1) low-frequency communication band of 600-800 MHz, (2) mid-frequency communication band of 1900-3700 MHz, and (3) high-frequency communication band of 24-39 GHz. These bands provide different signal performance based on the distance between the UAV to the base station and the height of the UAV.

With respect to the communication uplink for the UAV 116, the UAV communication controller 118 may determine whether the UAV 116 that is communicating with the base station 104 is within a predetermined distance 130 of the base station 104. If the UAV 116 is within the predetermined distance 130, the UAV communication controller 118 may determine whether the UAV is located between the antenna height threshold 120 and a band switch height threshold 132 that is higher in elevation relative to the ground level 114 than the antenna height threshold 120. For example, the band switch height threshold may be pre-established at 200 feet above the ground level 114. Thus, if the UAV 116 is located between the two height thresholds, the UAV communication controller 118 may direct the base station 104 to use the high-frequency communication band for the communication uplink between the base station 104 and the UAV 116. On the other hand, if the UAV 116 is not located between the two height thresholds, the UAV communication controller 118 may direct the base station 104 to use the mid-frequency communication band or the low-frequency communication band for the communication uplink between the base station 104 and the UAV 116.

However, if the UAV communication controller 118 determines that the UAV 116 is not within the predetermined distance 130 of the base station 104, the UAV communication controller 118 may instead make a determination as to whether the UAV 116 is located at or below the band switch height threshold 132. If so, the UAV communication controller 118 may direct the base station 104 to use the mid-frequency communication band or the low-frequency communication band for the communication uplink between the base station 104 and the UAV 116. On the other hand, if the UAV 116 is not located at or below the band switch height threshold 132, the UAV communication controller 118 may direct the base station 104 to use the high-frequency communication band for the communication uplink between the base station 104 and the UAV 116.

With respect to the communication downlink for the UAV 116, the UAV communication controller 118 may determine whether the UAV 116 that is communicating with the base station 104 is within the predetermined distance 130 of the base station 104. If the UAV 116 is within the predetermined distance 130, the UAV communication controller 118 may determine whether the UAV is located at or below the band switch height threshold 132. Thus, if the UAV 116 is located at or below the band switch height threshold 132, the UAV communication controller 118 may direct the base station 104 to use the high-frequency communication band for the communication downlink between the base station 104 and the UAV 116. On the other hand, if the UAV 116 is not located at or below the band switch height threshold 132, the UAV communication controller 118 may direct the base station 104 to use the mid-frequency communication band or the low-frequency communication band for the communication downlink between the base station 104 and the UAV 116.

However, if the UAV communication controller 118 determines that the UAV 116 is not within a predetermined distance 130 of the base station 104, the UAV communication controller 118 may make a determination as to whether the UAV 116 is located at or below the band switch height threshold 132. If so, the UAV communication controller 118 may direct the base station 104 to use the mid-frequency communication band or the low-frequency communication band for the communication downlink between the base station 104 and the UAV 116. On the other hand, if the UAV 116 is not located below the band switch height threshold 132, the UAV communication controller 118 may direct the base station 104 to use the high-frequency communication band for the communication downlink between the base station 104 and the UAV 116.

In further embodiments, the UAV communication controller 118 may further take into consideration the speed of the UAV 116 to switch between communication bands. In such embodiments, the UAV communication controller 118 may determine whether the UAV 116 is traveling faster than a speed threshold at any time when the base station 104 is communicating with the UAV 116 via the high-frequency communication band. For example, the speed threshold may be 120 miles per hour. Thus, if the UAV 116 is traveling faster than the speed threshold, the UAV communication controller 118 may direct the base station 104 to use a low-frequency communication band or a mid-frequency communication band for the communication uplink and downlink between the UAV 116 and the base station 104. On the other hand, if the UAV is not traveling faster than the speed threshold, the UAV communication controller 118 may direct the base station 104 to maintain the use of the high-frequency communication band for the communication uplink and downlink between the UAV 116 and the base station 104.

In additional embodiments, the base station 104 may use any of the communication bands in conjunction with an available unlicensed band for carrier aggregation. Further, while the above embodiments are described in the context of the UAV communication controller 118 being a part of the base station 104, the UAV communication controller 118 may be implemented by computing devices 134 of the core network 102 in alternative embodiments. In other alternative embodiments, the UAV communication controller 118 may direct the UAV 116 to initiate the FDD/TDD switch and the communication frequency band switch with the base station 104, rather than direct the base station 104 to initiate these changes.

Example UAV Components

Figure 2:
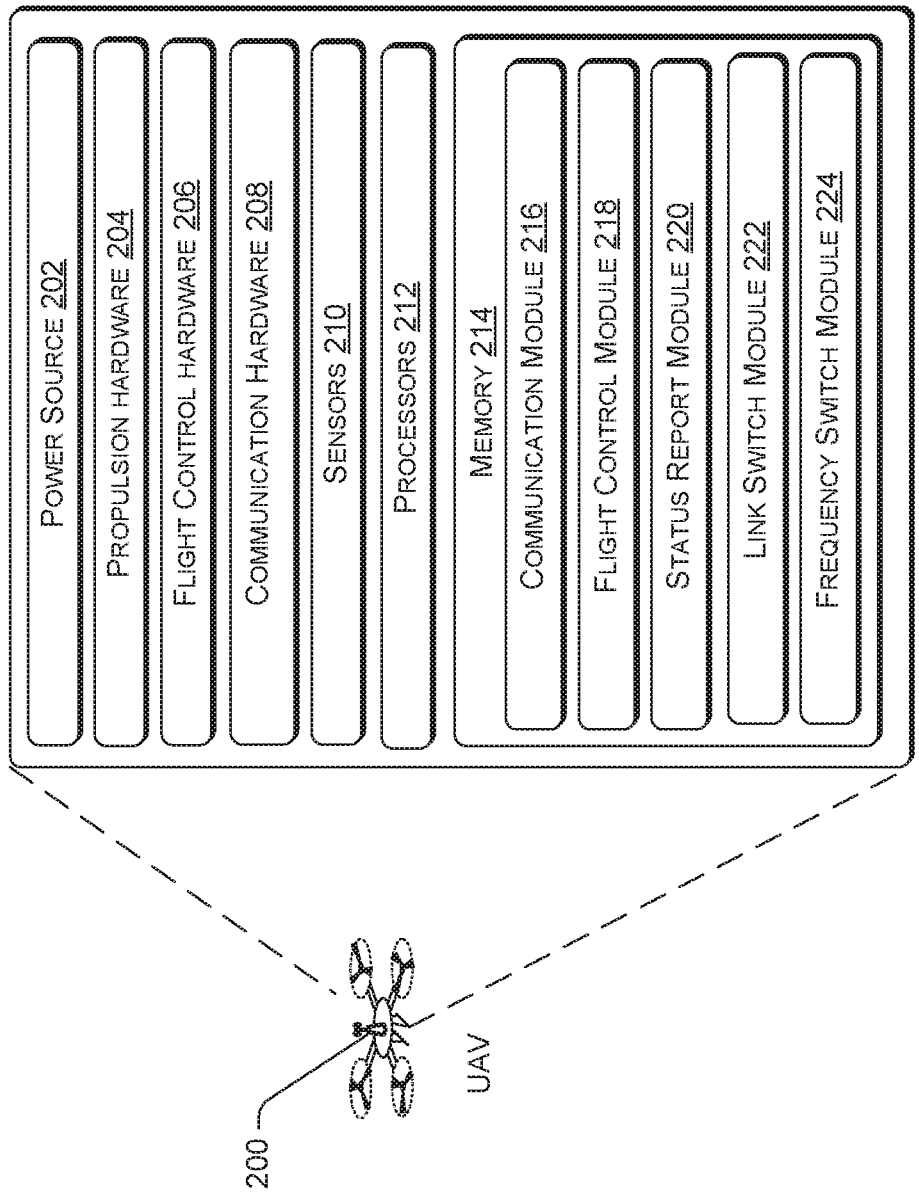
FIG. 2 is a block diagram showing various components of a UAV that is configured to operate in a manner that mitigates radio signal interference of the UAV on a wireless carrier network.

FIG. 2 is a block diagram showing various components of a UAV that is configured to operate in a manner that mitigates radio signal interference of the UAV on a wireless carrier network. The UAV 200 may include a power source 202, propulsion hardware 204, flight control hardware 206, communication hardware 208, sensors 210, one or more processors 212, and memory 214. The power source 202 may include electrical cells, combustible liquid fuel, combustible gas fuel, compressed gas, and/or other energy sources. The propulsion hardware 204 may include mechanical devices that are capable of converting the energy provided by the power source 202 into movements of the UAV 200. For example, the propulsion hardware may include an internal combustion engine, an electrical motor, a jet engine, a turboprop engine, propellers, rotors, and/or so forth that are mounted on the wings and/or the body of the UAV 200.

The flight control hardware 206 may include actuators and control surfaces that are capable of steering the UAV 200. For example, the actuators may include hydraulic actuators, gas-powered actuators, electrical actuators, and/or so forth. The actuators may move or deflect control surfaces to control the movement of the UAV 200. The control surfaces may include tilt wings, rudders, slats, ailerons, elevators, trim tabs, fins, canards, and/or so forth. In some embodiments, the flight control hardware 206 may be integrated with the propulsion hardware 204. For example, such integrated hardware may include tilt rotors, variable pitch rotors, jet engines with movable thrust nozzles, and/or so forth.

The communication hardware 208 may include hardware components that enable the UAV 200 to communicate with other UAV communication cells and vehicles on the ground. In various embodiments, the communication hardware 208 may further include cellular transceivers, hardware decoders and encoders, an antenna controller, a memory buffer, a network interface controller, a universal serial bus (USB) controller, and/or other signal processing and communication components. Accordingly, the communication hardware 208 may support multiple forms of cellular communication, such as FDD communication and TDD communication, using multiple radio frequency bands. The communication hardware 208 may further include one or more antennas that support the transmission and reception of data signals. The antennas may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antennas. In some instances, an antenna may be oriented to point to a particular direction via electrical beamforming and/or via mechanical movement of one or more elements of the antenna by an antenna controller.

The sensors 210 may include a camera, a radar, a compass, an airspeed sensor, an altitude sensor, a global positioning system (GPS) sensor, control setting sensors, propulsion setting sensors, vehicle system health sensors, a transponder interrogator, and/or other sensors. The various sensors may provide operational information regarding the UAV 200 that is transmitted by the communication hardware 208 to the core network 102.

Each of the processors 212 may be a single-core processor, a multi-core processor, a complex instruction set computing (CISC) processor, or another type of processor. The memory 214 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 212 and the memory 214 may implement a communication module 216, a flight control module 218, a status report module 220, a link switch module 222, and a frequency switch module 224. These modules may include routines, program instructions, objects, and/or data structures that perform particular tasks or implement particular abstract data types. The communication module 216 may work in conjunction with the communication hardware 208 to establish communication uplink and downlink with base stations, as well as facilitate the handover of the UAV 200 between different base stations based on the detected radio signal strengths of the base stations. For example, the communication module 216 may include radio drivers, data packet schedulers, data encoders, data decoders, antenna control software, and software that perform signal detection, data routing, data transmission, and data reception functions.

The flight control module 218 may receive control commands from a UAV controller of the UAV 200. The UAV controller may include one or more control devices that enable an operator to control the flight operations of the UAV 200. In turn, the flight control module 218 may manipulate the propulsion hardware 204 and the flight control hardware 206 according to the control commands. Further, the flight control module 218 may aggregate the operational information collected by the sensors 210 for transmission to the UAV communication controller 118. In some embodiments, the flight control module 218 may include algorithms that perform automatic flight operations, such as flying to a particular location from a departure point or landing at a specific location.

In other instances, the flight control module 218 may include an airborne collision avoidance system (ACAS) that automatically diverts the UAV 200 from a flight path in response to the proximity of another airborne vehicle that is sensed via radar information, image information, and/or transponder information that is obtained by the sensors 210, or in response to the proximity of a terrain obstacle that is stored in an internal map database of the UAV 200.

The status report module 220 may report telemetry information and vehicle operation information of the UAV 200 to the UAV controller. The telemetry information may include a speed of the UAV 200, an altitude of the UAV 200, a geolocation of the UAV 200, a flight path of the UAV 200, and/or so forth. The vehicle operation information may include engine status, fuel/power status, flight control surface status, communication equipment status, warning information, self-diagnostic information, and/or so forth. In some embodiments, the status report module 220 may be further configured to report telemetry information of the UAV 200 to a base station in response to a telemetry query from the base station.

The link switch module 222 may switch the communication uplink of the UAV 200 between FDD communication and TDD communication based on commands from a UAV communication controller, such as the UAV communication controller 118. In response to the commands from the UAV communication controller, the link switch module 222 may direct the communication module 216 and the communication hardware 208 to implement either FDD communication or TDD communication for a communication uplink with a base station. The frequency switch module 224 may switch the frequency bands used by the UAV 200 to communicate with a base station in response to commands from the UAV communication controller. Based on the corresponding commands, the link switch module 222 may direct the communication module 216 and the communication hardware 208 to use a high-frequency communication band, a mid-frequency communication band, or a low-frequency communication band to communicate with the base station.

Example UAV Communication Controller Components

Figure 3:
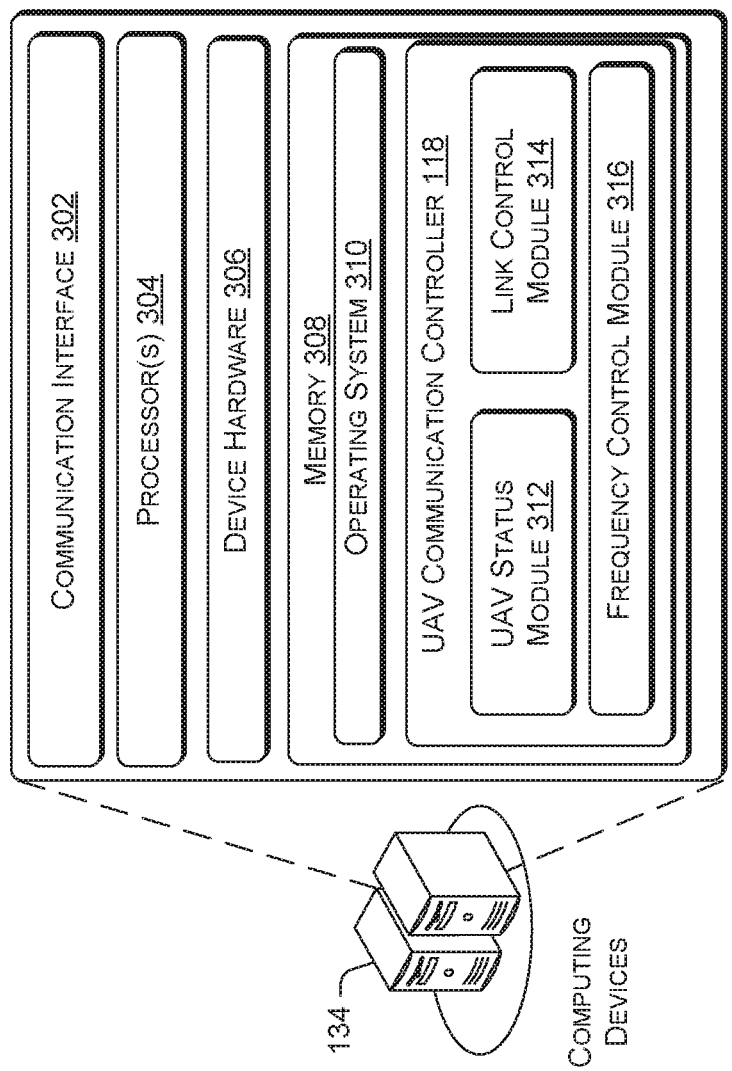
FIG. 3 is a block diagram showing various components of a UAV communication controller that interacts with UAVs to mitigate radio signal interference caused by the UAVs.

FIG. 3 is a block diagram showing various components of a UAV communication controller that interacts with UAVs to mitigate radio signal interference caused by the UAVs. The UAV communication controller 118 may be implemented on one or more computing devices 134 of a base station or the core network 102. The computing devices 134 may include general-purpose computers, servers, or other electronic devices that are capable of receiving inputs, processing the inputs, and generating output data. In other embodiments, the computing devices 134 may be virtual computing devices in the form of virtual machines or software containers that are hosted in a cloud.

The computing devices 134 may include a communication interface 302, one or more processors 304, device hardware 306, and memory 308. The communication interface 302 may include wireless and/or wired communication components that enable the computing devices to transmit data to and receive data from other networked devices via the wireless carrier network and/or an additional network. For example, the additional network may be a local area network (LAN), a larger network such as a wide area network (WAN), or a collection of networks, such as the Internet. The device hardware 306 may include additional hardware that performs user interface, data display, data communication, data storage, and/or other server functions.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 308 of the computing devices may implement an operating system 310, a UAV status module 312, a link control module 314, and a frequency control module 316. The modules may include routines, program instructions, objects, and/or data structures that perform particular tasks or implement particular abstract data types. The operating system 310 may include components that enable the computing devices to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The UAV status module 312 may be configured to obtain the flight status information of the UAVs. The flight status information of a UAV may include a geolocation of the UAV relative to a base station, such as the base station 104, an altitude of the UAV, and a speed of the UAV. In various embodiments, the UAV status module 312 may obtain the flight status information of a UAV via wireless communication with the UAV. The UAV status module 312 may establish a wireless communication session with the UAV that enables the exchange of data via a communication protocol, such as the transmission control protocol (TCP), the user datagram protocol (UDP), or another protocol. For example, the wireless communication session may be established on a control channel between the base station and the UAV. In turn, the UAV status module 312 may query to the UAV for the flight status information via the wireless communication session or wait for the UAV to periodically send the flight status information through the wireless communication session. Alternatively, or concurrently, the UAV status module 312 may coordinate radio triangulation between multiple base stations to determine the flight status information, such as the geolocation and the altitude, for the UAV.

Alternatively, the UAV communication controller 118 may communicate wirelessly with the paired UAV communication cell. As such, the UAV status module 312 may use a licensed band or an unlicensed band to establish a communication link with the paired UAV communication cell. In some embodiments, the UAV communication controller 118 may be connected to a base station via a physical connection. Accordingly, the UAV status module 312 may establish a communication link with the base station for the transport of data between the UAV communication controller 118 and the base station.

The link control module 314 may use the flight status information to generate commands that switch the communication uplink for a UAV to a base station between FDD communication and TDD communication. In various embodiments, the link control module 314 may compare one or more altitude measurements of the UAV to an antenna height threshold 120 to generate the appropriate commands. In such embodiments, the link control module 314 may send the commands to corresponding communication link switching logics of a base station or a UAV to cause switching of a communication uplink between the UAV and the base station between FDD communication and TDD communication. For example, the link control module 314 may send the commands to the UAV via a control channel, or to a base station via a backhaul network of the wireless carrier network.

The frequency switch module 224 may use the flight status information to generate commands that switch the frequency bands used by a UAV and a base station. In some embodiments, the frequency switch module 224 may compare one or more altitude measurements of the UAV to the antenna height threshold 120 and the band switch height threshold 132 to generate some frequency switching commands. Alternatively, or concurrently, the frequency switch module 224 may compare one or more speed measurements of the UAV to a speed threshold to generate other frequency switching commands. In these embodiments, the frequency switch module 224 may send the commands to corresponding communication link switching logics of a base station or a UAV to cause switching of a communication link between the base station and the UAV between FDD communication and TDD communication. For example, the frequency switch module 224 may send the commands to the UAV via a control channel, or to a base station via a backhaul network of the wireless carrier network.

Example Processes

FIGS. 4-7 present illustrative processes 400-700 for mitigating radio signal interference caused by UAVs that use a wireless carrier network. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the architecture 100 of FIG. 1.

Figure 4:
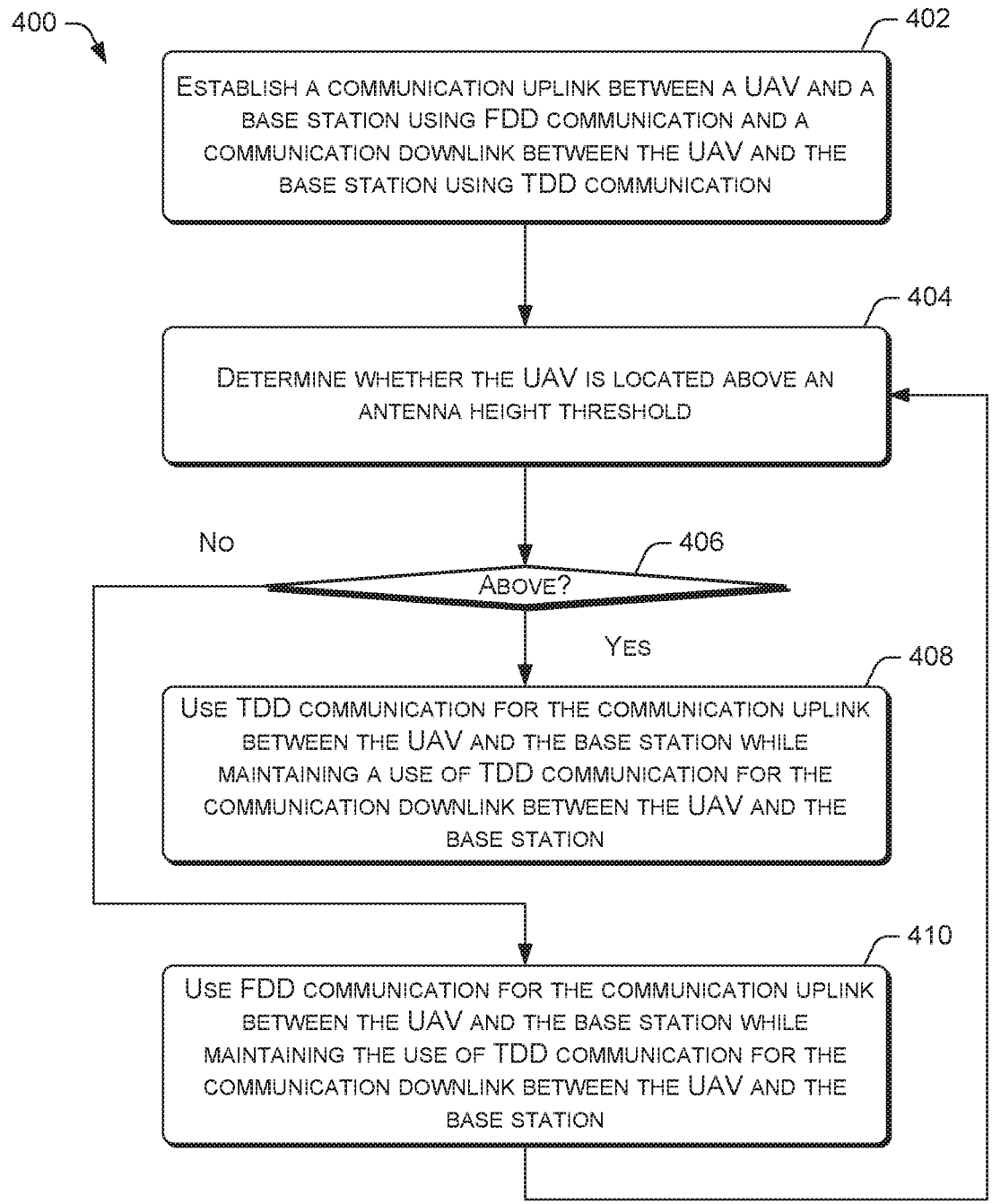
FIG. 4 is a flow diagram of an example process for switching a UAV between using frequency division duplex (FDD) communication and time division duplex (TDD) communication.

FIG. 4 is a flow diagram of an example process 400 for switching a UAV between using frequency division duplex (FDD) communication and time division duplex (TDD) communication. At block 402, a base station of a wireless carrier network may establish a communication uplink between a UAV and a base station using FDD communication and a communication downlink between the UAV and the base station using TDD communication. For example, the base station 104 may establish the communication uplink and the communication downlink with the UAV 116. In various embodiments, the base station may establish the communication uplink and downlink with the UAV while the UAV is in flight and in the proximity of the base station. At block 404, the UAV communication controller 118 of the wireless carrier network may determine whether the UAV is located above an antenna height threshold, such as the antenna height threshold 120. For example, the antenna height threshold may be established at a height of 100 feet. At decision block 406, if the UAV is located above the antenna height threshold ("yes" at decision block 406), the process 400 may proceed to block 408. At block 408, the UAV communication controller 118 may direct the UAV and the base station to use TDD communication for the communication uplink between the UAV and the base station while maintaining the use of the TDD communication for the communication downlink between the UAV and the base station. In other words, the UAV communication controller 118 may transition the UAV from using FDD communication to TDD communication for the communication uplink. For example, the UAV communication controller 118 may send a link switch command that directs the base station or the UAV to initiate a switch to the use of TDD communication for the communication uplink.

However, if the UAV is not located above the antenna height threshold ("yes" at decision block 406), the UAV communication controller 118 may send no link switch to the UAV or the base station. As such, the UAV and the base station may use the FDD communication for the communication uplink between the UAV and the base station while maintaining the use TDD communication for the communication downlink between the UAV and the base station. Subsequently, the process 400 may loop back to block 404. In some instances, the UAV may be dropping altitude at this point so that the UAV is located at or below the antenna height threshold. At such a point, the process may proceed from decision block 406 to decision block 410, so that the UAV communication controller 118 may direct the UAV and the base station to once again FDD communication for the communication uplink between the UAV and the base station while maintaining the use of the TDD communication for the communication downlink between the UAV and the base station. For example, the UAV communication controller 118 may send a link switch command that directs the base station or the UAV to initiate a switch to the use of FDD communication for the communication uplink.

Figure 5:
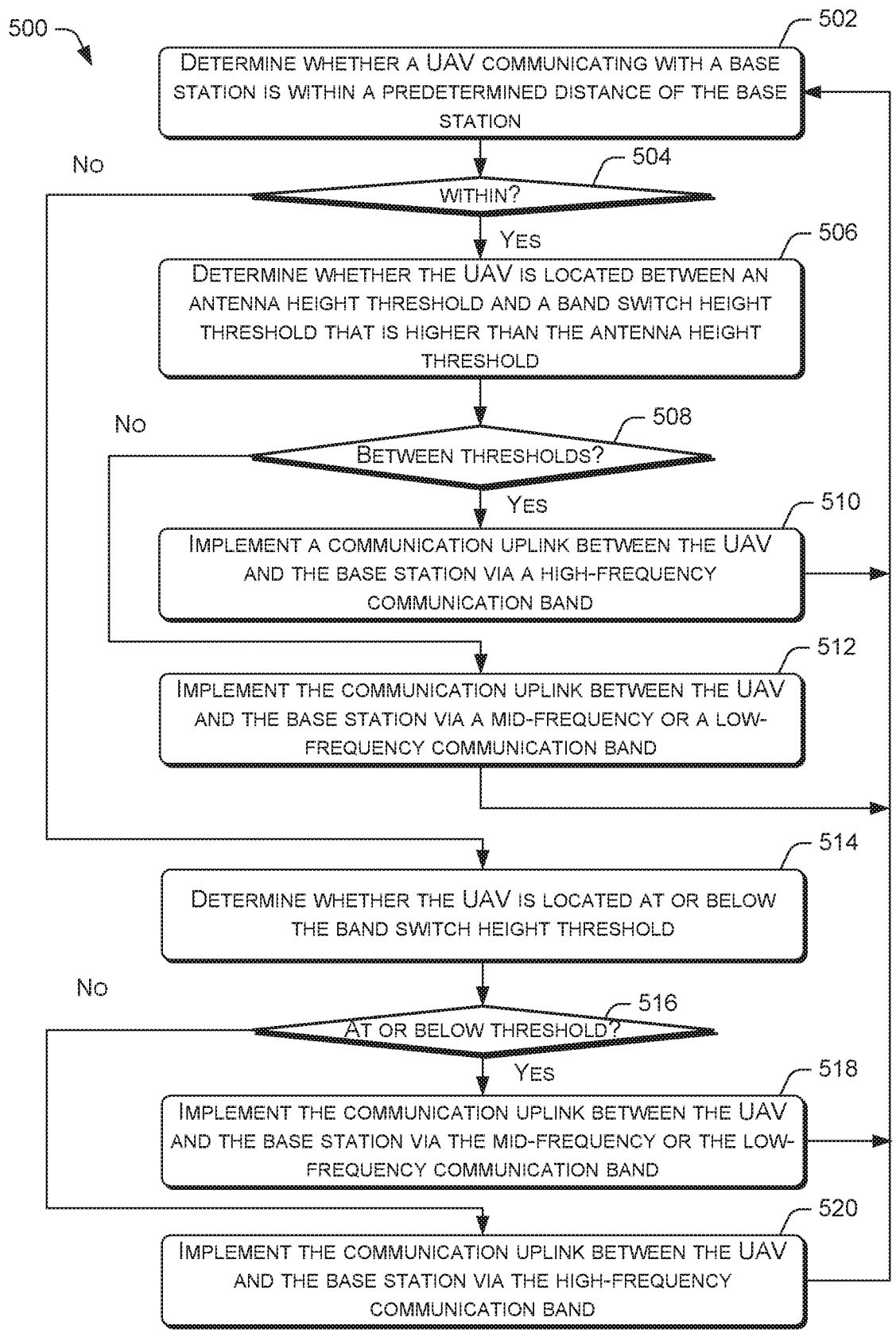
FIG. 5 is a flow diagram of an example process for switching uplink communication of a UAV between multiple frequency ranges based on a location of the UAV.

FIG. 5 is a flow diagram of an example process 500 for switching uplink communication of a UAV between multiple frequency ranges based on a location of the UAV. At block 502, the UAV communication controller 118 may determine whether the UAV communicating with a base station is within a predetermined distance of the base station. In various embodiments, the UAV may be flying in the proximity of the base station. At decision block 504, if the UAV communication controller 118 determines that the UAV is within the predetermined distance of the base station ("yes" at decision block 504), the process 500 may proceed to block 506. At block 506, the UAV communication controller 118 may determine whether the UAV is located between an antenna height threshold and a band switch height threshold that is higher than the antenna height threshold.

At decision block 508, if the UAV is located between the antenna height threshold and the band switch height threshold ("yes" at decision block 508), the process 500 may proceed to block 510. At block 510, the UAV communication controller 118 may implement a communication uplink between the UAV and the base station via a high-frequency communication band. For example, the UAV communication controller 118 may send a command that directs the base station or the UAV to use the high-frequency communication band for the communication uplink. Such a command may have no effect if the base station and UAV are already using the high-frequency communication band for the communication uplink. Subsequently, the process 500 may loop back to block 502.

Returning to decision block 508, if the UAV is not located between the antenna height threshold and the band switch height threshold ("no" at decision block 508), the process 500 may proceed to block 512. For example, the UAV may be located at or below the antenna height threshold and above the band switch height threshold. At block 512, the UAV communication controller 118 may implement the communication uplink between the UAV and the base station via a mid-frequency communication band or a low-frequency communication band. For example, the UAV communication controller 118 may send a command that directs the base station or the UAV to use the mid-frequency communication band or the low-frequency communication band for the communication uplink. Such a command may have no effect if the base station and UAV are already using one of these communication bands for the communication uplink. Subsequently, the process 500 may loop back to block 502.

Returning to decision block 504, if the UAV communication controller 118 determines that the UAV is not within the predetermined distance of the base station ("no" at decision block 504), the process 500 may proceed to block 514. For example, the UAV may be further than the predetermined distance from the base station. At block 514, the UAV communication controller 118 may determine whether the UAV is located at or below the band switch height threshold. At decision block 516, if the UAV is located at or below the band switch height threshold ("yes" at decision block 516), the process 500 may proceed to block 518. At block 518, the UAV communication controller 118 may implement the communication uplink between the UAV and the base station via the mid-frequency communication band or the low-frequency communication band. For example, the UAV communication controller 118 may send a command that directs the base station or the UAV to use the mid-frequency communication band or the low-frequency communication band for the communication uplink. Such a command may have no effect if the base station and UAV are already using one of these communication bands for the communication uplink. Subsequently, the process 500 may loop back to block 502.

However, if the UAV is located above the band switch height threshold ("no" at decision block 516), the process 500 may proceed to block 520. At block 520, the UAV communication controller 118 may implement the communication uplink between the UAV and the base station via the high-frequency communication band. For example, the UAV communication controller 118 may send a command that directs the base station or the UAV to use the high-frequency communication band for the communication uplink. Such a command may have no effect if the base station and UAV are already using the high-frequency communication band for the communication uplink. Subsequently, the process 500 may loop back to block 502.

Figure 6:
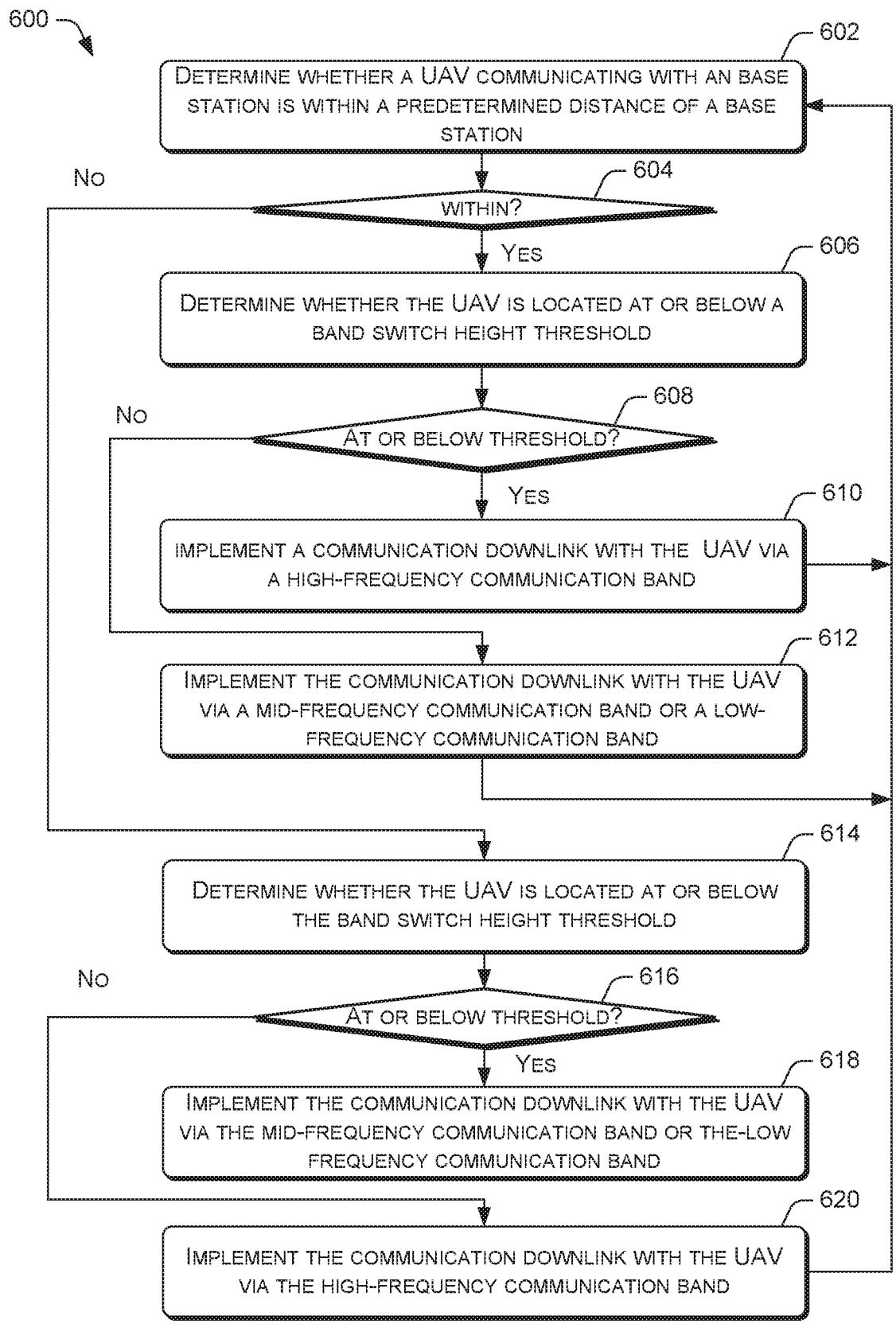
FIG. 6 is a flow diagram of an example process for switching downlink communication of a UAV between multiple frequency ranges based on a location of the UAV.

FIG. 6 is a flow diagram of an example process 600 for switching downlink communication of a UAV between multiple frequency ranges based on a location of the UAV. At block 602, the UAV communication controller 118 may determine whether the UAV communicating with a base station is within a predetermined distance of the base station. In various embodiments, the UAV may be flying in the proximity of the base station. At decision block 604, if the UAV communication controller 118 determines that the UAV is within the predetermined distance of the base station ("yes" at decision block 604), the process 600 may proceed to block 606. At block 606, the UAV communication controller 118 may determine whether the UAV is located at or below a band switch height threshold. At decision block 608, if the UAV is located at or below the band switch height threshold ("yes" at decision block 608), the process 600 may proceed to block 610. At block 610, the UAV communication controller 118 may implement a communication downlink between the UAV and the base station via a high-frequency communication band. For example, the UAV communication controller 118 may send a command that directs the base station or the UAV to use the high-frequency communication band for the communication downlink. Such a command may have no effect if the base station and UAV are already using the high-frequency communication band for the communication downlink. Subsequently, the process 600 may loop back to block 602.

Returning to decision block 608, if the UAV is not located at or below the band switch height threshold ("no" at decision block 608), the process 600 may proceed to block 612. At block 612, the UAV communication controller 118 may implement the communication downlink between the UAV and the base station via a mid-frequency communication band or a low-frequency communication band. For example, the UAV communication controller 118 may send a command that directs the base station or the UAV to use the mid-frequency communication band or the low-frequency communication band for the communication downlink. Such a command may have no effect if the base station and UAV are already using one of these communication bands for the communication downlink. Subsequently, the process 600 may loop back to block 602.

Returning to decision block 604, if the UAV communication controller 118 determines that the UAV is not within the predetermined distance of the base station ("no" at decision block 604), the process 600 may proceed to block 614. For example, the UAV may be further than the predetermined distance from the base station. At block 614, the UAV communication controller 118 may determine whether the UAV is located at or below the band switch height threshold. At decision block 616, if the UAV is located at or below the band switch height threshold ("yes" at decision block 616), the process 600 may proceed to block 618. At block 618, the UAV communication controller 118 may implement the communication downlink between the UAV and the base station via the mid-frequency communication band or the low-frequency communication band. For example, the UAV communication controller 118 may send a command that directs the base station or the UAV to use the mid-frequency communication band or the low-frequency communication band for the communication downlink. Such a command may have no effect if the base station and UAV are already using one of these communication bands for the communication downlink. Subsequently, the process 600 may loop back to block 602.

However, if the UAV is located above the band switch height threshold ("no" at decision block 616), the process 600 may proceed to block 620. At block 620, the UAV communication controller 118 may implement the communication downlink between the UAV and the base station via the high-frequency communication band. For example, the UAV communication controller 118 may send a command that directs the base station or the UAV to use the high-frequency communication band for the communication downlink. Such a command may have no effect if the base station and UAV are already using the high-frequency communication band for the communication downlink. Subsequently, the process 600 may loop back to block 602.

Figure 7:
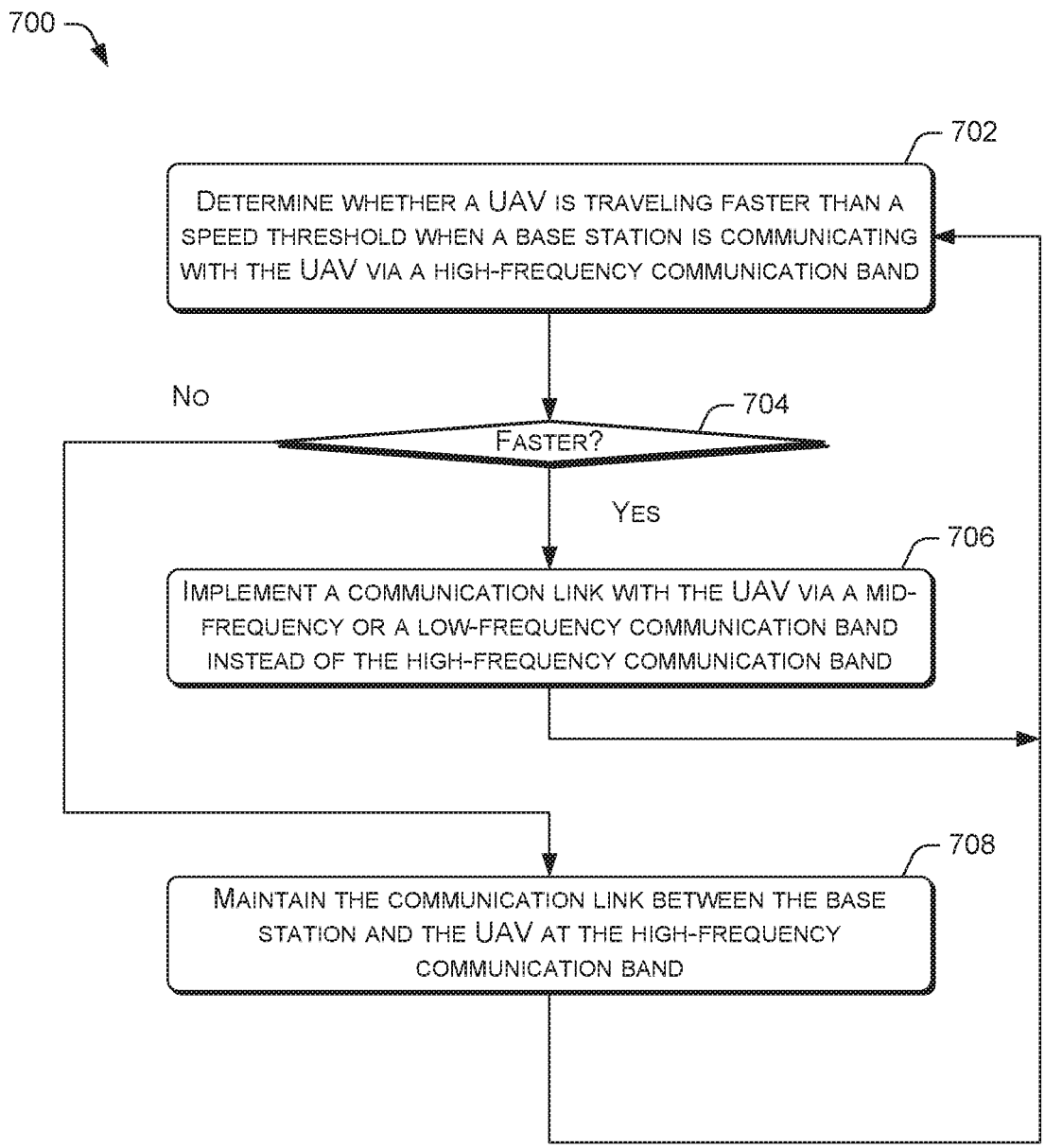
FIG. 7 is a flow diagram of an example process for switching a UAV that is communicating with a UAV via a high-frequency communication band to a lower frequency communication band based on a traveling speed of the UAV.

FIG. 7 is a flow diagram of an example process 700 for switching a UAV that is communicating with a UAV via a high-frequency communication band to a lower frequency communication band based on a traveling speed of the UAV. At block 702, the UAV communication controller 118 may determine whether the UAV is traveling faster than a speed threshold when a base station is communicating with the UAV via a high-frequency communication band. At decision block 704, if the UAV is traveling faster than the speed threshold ("yes" at decision block 704), the process 700 may proceed to block 706. At block 706, the UAV communication controller 118 may implement a communication link via a mid-frequency communication band or a low-frequency communication band. In various embodiments, the communication link may be a communication uplink or a communication downlink between the UAV and the base station. For example, the UAV communication controller 118 may send a command that directs the base station or the UAV to use the mid-frequency communication band or the low-frequency communication band for the communication link. Such a command may have no effect if the base station and UAV are already using one of these communication bands for the communication link. Subsequently, the process 700 may loop back to block 702.

However, if the UAV is not traveling faster than the speed threshold ("no" at decision block 704), the process 700 may proceed to block 708. At block 708, the UAV communication controller 118 may maintain the communication link between the base station and the UAV at the high-frequency communication band. For example, the UAV communication controller 118 does not send a communication band switching command to the base station or the UAV. Subsequently, the process 700 may loop back to block 702.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an unmanned aerial vehicle (UAV) communication controller storing computer-executable instructions that upon execution cause one or more computing nodes to perform acts comprising:
    determining, for communication frequency switching, whether the UAV is located between an antenna height threshold of one or more base stations and a band switching height threshold that is higher than the antenna height threshold when the UAV is within a predetermined distance of a base station of the one or more base stations following an establishment of a communication uplink between the UAV and the base station using frequency division duplex (FDD) communication and a communication downlink between the UAV and the base station using time division duplex (TDD) communication;
    in response to determining that the UAV is located between the antenna height threshold and the band switching height threshold, implementing the communication uplink via at least a high-frequency communication band; and
    in response to determining that the UAV is not located between the antenna height threshold and the band switching height threshold, implementing the communication uplink via at least a mid-frequency communication band or a low-frequency communication band.

2. The one or more non-transitory computer-readable media of claim 1, wherein determining whether the UAV is located above an antenna height threshold includes receiving an altitude of the UAV from the UAV or determining the altitude of the UAV via radio triangulation.

3. The one or more non-transitory computer-readable media of claim 1, wherein in the acts further comprise:
    determining, for switching between the FDD communication and the TDD communication, whether the UAV is located above an antenna height threshold of the one or more base stations;
    in response to the UAV being located above the antenna height threshold of the one or more base stations, transitioning from using the FDD communication to using the TDD communication for the communication uplink while continuing use of the TDD communication for the communication downlink; and
    in response to the UAV being located at or below the antenna height threshold of the one or more base stations, continuing use of the FDD communication for the communication uplink and the TDD communication for the communication downlink.

4. The one or more non-transitory computer-readable media of claim 3, wherein the transitioning includes sending a command to the base station or the UAV to direct the use of the TDD communication instead of the FDD communication.

5. The one or more non-transitory computer-readable media of claim 1, wherein the implementing the communication uplink includes combining a use of the high-frequency communication band, the mid-frequency communication band, or the low-frequency communication band with a use of an unlicensed frequency band.

6. The one or more non-transitory computer-readable media of claim 1, wherein the low-frequency communication band includes a band of 600-800 MHz, the mid-frequency communication band includes a band of 1900-3700 MHz, and the high-frequency communication band includes a band of 24-39 GHz.

7. The one or more non-transitory computer-readable media of claim 1, wherein the implementing the communication uplink includes sending a command to the base station or the UAV to direct the use of a corresponding communication band for the communication uplink.

8. The one or more non-transitory computer-readable media of claim 1, wherein the acts further comprise:
    determining, for the communication frequency switching, whether the UAV is located at or below the band switching height when the UAV is not within the predetermined distance of the base station;
    in response to determining that the UAV is located at or below the band switching height threshold, implementing the communication uplink via at least the mid-frequency communication band or the low-frequency communication band; and
    in response to determining that the UAV is above the band switching height threshold, implementing the communication uplink via at least the high-frequency communication band.

9. The one or more non-transitory computer-readable media of claim 1, wherein the acts further comprise:
    in response to determining that the UAV is located at or below the band switching height threshold, implementing the communication downlink via at least the high-frequency communication band; and
    in response to determining that the UAV is located above the band switching height threshold, implementing the communication downlink via at least the mid-frequency communication band or the low-frequency communication band.

10. The one or more non-transitory computer-readable media of claim 9, wherein the implementing the communication downlink includes sending a command to the base station or the UAV to direct the use of a corresponding communication band for the communication downlink.

11. The one or more non-transitory computer-readable media of claim 1, wherein the acts further comprise:
    determining, for the communication frequency switching, whether the UAV is located below the band switching height when the UAV is not within the predetermined distance of the base station;
    in response to determining that the UAV is located at or below the band switching height threshold, implementing the communication downlink via at least a mid-frequency communication band or a low-frequency communication band; and
    in response to determining that the UAV is located above the band switching height threshold, implementing the communication downlink via at least a high-frequency communication band.

12. The one or more non-transitory computer-readable media of claim 1, wherein the acts further comprise:
  determining whether the UAV is traveling faster than a predetermined speed threshold when the base station is communicating with the UAV via at least the high-frequency communication band; and
  in response to determining that the UAV is traveling faster than the predetermined speed threshold, transitioning the communication uplink and the communication downlink from using the high-frequency communication band to using the mid-frequency communication band or the low-frequency communication band.

13. The one or more non-transitory computer-readable media of claim 1, wherein the base station is a 4G base station or a 5G base station.

14. A system, comprising:
  one or more processors; and
  memory including a plurality of computer-executable components of a server application that are executable by the one or more processors to perform a plurality of actions, the plurality of actions comprising:
    determining, for communication frequency switching, a location of an unmanned aerial vehicle (UAV) relative to at least one of an antenna height threshold of one or more base stations and a band switching height threshold that is higher than the antenna height threshold when the UAV is within a predetermined distance of a base station of the one or more base stations following an establishment of a communication uplink between the UAV and the base station using frequency division duplex (FDD) communication and a communication downlink between the UAV and the base station using time division duplex (TDD) communication;
    in response to determining that the UAV is located below the band switching height threshold, implementing the communication downlink via at least a high-frequency communication band; and
    in response to determining that the UAV is above the band switching height threshold, implementing the communication downlink via at least a mid-frequency communication band or a low-frequency communication band.

15. The system of claim 14, wherein the actions further comprise:
  in response to determining that the UAV is located between the antenna height threshold and the band switching height threshold, implementing the communication uplink via at least the high-frequency communication band; and
  in response to determining that the UAV is not located between the antenna height threshold and the band switching height threshold, implementing the communication uplink via at least the mid-frequency communication band or the low-frequency communication band.

16. The system of claim 14, wherein the actions further comprise:
  determining, for the communication frequency switching, whether the UAV is located at or below the band switching height threshold that is higher than the antenna height threshold when the UAV is not within the predetermined distance of the base station;
  in response to determining that the UAV is located at or below the band switching height threshold, implementing the communication uplink via at least the mid-frequency communication band or the low-frequency communication band; and
  in response to determining that the UAV is located above the band switching height threshold, implementing the communication uplink via at least the high-frequency communication band.

17. The system of claim 14, wherein the acts further comprise:
  determining, for switching between the FDD communication and the TDD communication, whether the UAV is located above the antenna height threshold of the one or more base stations;
  in response to the UAV being located above the antenna height threshold of the one or more base stations, transitioning from using the FDD communication to using the TDD communication for the communication uplink while continuing use of the TDD communication for the communication downlink; and
  in response to the UAV being located at or below the antenna height threshold of the one or more base stations, continuing use of the FDD communication for the communication uplink and the TDD communication for the communication downlink.

18. The system of claim 14, wherein the acts further comprise:
  determining, for the communication frequency switching, whether the UAV is located below the band switching height threshold that is higher than the antenna height threshold when the UAV is not within the predetermined distance of the base station;
  in response to determining that the UAV is located at or below the band switching height threshold, implementing the communication downlink via at least the mid-frequency communication band or the low-frequency communication band; and
  in response to determining that the UAV is located above the band switching height threshold, implementing the communication downlink via at least the high-frequency communication band.

19. The system of claim 14, wherein the acts further comprise:
  determining whether the UAV is traveling faster than a predetermined speed threshold when the base station is communicating with the UAV via at least the high-frequency communication band; and
  in response to determining that the UAV is traveling faster than the predetermined speed threshold, transitioning the communication uplink and the communication downlink from using the high-frequency communication band to using the mid-frequency communication band or the low-frequency communication band.

20. A computer-implemented method, comprising:
  determining, at one or more computing devices, whether an unmanned aerial vehicle (UAV) is located between an antenna height threshold of one or more base stations and a band switching height threshold that is higher than the antenna height threshold when the UAV is within a predetermined distance of a base station of the one or more base stations following an establishment of a communication uplink between the UAV and the base station using frequency division duplex (FDD) communication and a communication downlink between the UAV and the base station using time division duplex (TDD) communication;
  in response to determining that the UAV is located between the antenna height threshold and the band switching height threshold, implementing the communication uplink via at least a high-frequency communication band; and in response to determining that the UAV is not located between the antenna height threshold and the band switching height threshold, implementing the communication uplink via at least a mid-frequency communication band or a low-frequency communication band.

* * * * *